United States Patent [19]

Adelmann et al.

[11] 4,041,003
[45] * Aug. 9, 1977

[54] PROCESS FOR MOLDING AROMATIC POLYCARBONATES HAVING PERFLUOROALKANESULPHONIC ACID DERIVATIVES AS MOLD RELEASE AGENTS

[75] Inventors: Siegfried Adelmann, Krefeld; Dieter Margotte, Krefeld-Fischeln; Hugo Vernaleken, Krefeld-Bockum; Hans Niederprüm, Monheim, Rhineland; Johann Nikolaus Meussdoerffer; Werner Nouvertne, both of Krefeld, all of Germany

[73] Assignee: Bayer Aktiengesellschaft, Leverkusen, Germany

[*] Notice: The portion of the term of this patent subsequent to Feb. 8, 1994, has been disclaimed.

[21] Appl. No.: 656,229

[22] Filed: Feb. 9, 1976

[30] Foreign Application Priority Data

Feb. 18, 1975  Germany .............................. 2506726

[51] Int. Cl.² ................................................ C08K 5/36

[52] U.S. Cl. ............................. 260/30.8 R; 260/32.4; 260/32.6 R; 260/37 PC

[58] Field of Search ................. 260/30.8, 37 PC, 32.4, 260/32.6 R, 556 F, 567.6 M

[56] References Cited

U.S. PATENT DOCUMENTS 3,775,367  11/1973  Nouvertne ......................... 252/8.1 X
3,836,499  9/1974  Schirmer et al. ............... 260/31.2 R

*Primary Examiner*—Lewis T. Jacobs
*Attorney, Agent, or Firm*—Gene Harsh; Lawrence S. Pope; Frederick H. Colen

[57] ABSTRACT

The present invention is concerned with a process for molding thermoplastic, high molecular weight aromatic polycarbonates the improvement which comprises adding to the aromatic polycarbonate from about 0.001 to 1% by weight of a mold release agent selected from the group consisting of perfluoroalkanesulphonic acid amides, cyclimmonium salts of perfluoroalkanesulphonic acids and ammonium salts of perfluoroalkanesulphonic acids.

8 Claims, No Drawings

PROCESS FOR MOLDING AROMATIC POLYCARBONATES HAVING PERFLUOROALKANESULPHONIC ACID DERIVATIVES AS MOLD RELEASE AGENTS

BACKGROUND OF THE INVENTION

Aromatic polycarbonates are employed in numerous technical fields of application because of their typical tough and elastic properties. A disadvantage is their poor mold release when injection-molded which frequently results in relatively long cycle times. However, for economic and technical reasons it is desirable to shorten the cycle times as far as possible so as to manufacture larger numbers of moldings per unit time on the injection molding machines. This can be achieved, for example, by injection molding at higher temperatures. However, for this purpose the polycarbonate melt must be so modified that the release of the molding from the mold wall takes place with low release forces and at high temperatures without sticking of the solidified melt to the mold wall. Easy mold release at high temperatures is in particular also desired in the case of complicated moldings which are produced in molds with parts which cannot be cooled (for example cross-webs, cores and the like).

In the past, long-chain aliphatic carboxylic acid esters of monohydric and trihydric alcohols have been added to improve the mold release of aromatic polycarbonates in accordance with DOS (German published specification) No. 2,064,095, DOS (German published specification) No. 2,220,185, U.S. Pat. No. 3,784,595 and U.S. Pat. No. 3,836,499. However, a disadvantage of these mold release agents is the deterioration of the mechanical properties of the aromatic polycarbonates on prolonged heat exposure as a result of which the aromatic polycarbonates which have been modified according to DOS (German published specification) No. 2,064,095 and DOS (German published specification) No. 2,220,185, U.S. Pat. Nos. 3,784,595 and 3,836,499 in order to give easy mold release no longer satisfy certain technical requirements.

U.S. Pat. No. 3,775,367 discloses the use of specific perfluoroalkanesulphonic acid derivatives as additives to polycarbonates to improve the flame resistance of polycarbonates, but makes no mention of the mold release properties of the additives.

SUMMARY OF THE INVENTION

It is now the object of the present invention to provide a process for molding thermoplastic, high molecular weight aromatic polycarbonates the improvement which comprises adding to the aromatic polycarbonate a mold release agent, for obtaining mold, release properties which are adequate for all industrial applications of the polycarbonate, while on the other hand the release agent leaves the level of mechanical properties of the pure aromatic polycarbonates essentially unaffected even after prolonged heat exposure. In view of the advantages described above, a process for molding thermoplastic, high molecular weight aromatic polycarbonates at higher mold release temperatures is particularly desirable.

Accordingly, the subject of the present invention is a process for molding thermoplastic, high molecular weight, aromatic polycarbonates the improvement which comprises adding to the aromatic polycarbonate a mold release agent selected from the group consisting of perfluoroalkanesulphonic acid amides, ammonium salts of perfluoroalkanesulphonic acids and cyclimmonium salts of perfluoroalkanesulphonic acids. In the sense of the invention "molding thermoplastic, high molecular weight, aromatic polycarbonates" is understood as any kind of known molding of thermoplastic high molecular weight aromatic polycarbonates.

DETAILED DESCRIPTION OF THE INVENTION

High molecular, thermoplastic, aromatic polycarbonates are in particular those based on dihydroxydiaryl compounds of the formula I

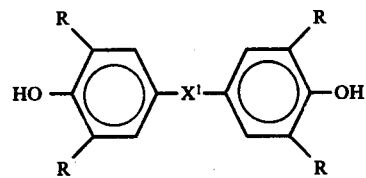

wherein
R are identical or different and are H, $C_1$–$C_4$ alkyl, Cl or Br and
$X^1$ is $C_1$–$C_8$ alkylene, $C_2$–$C_8$ alkylidene, $C_5$–$C_{15}$ cycloalkylene and $C_5$–$C_{15}$ cycloalkylidene.

Perfluoroalkanesulphonic acid amides are in particular those of the formula IIa $$R_F - SO_2 - X \qquad \text{IIa}$$

wherein
$R_F$ is a linear or branched aliphatic perfluoroalkyl radical with 1 to 12 C atoms or a cyclic aliphatic perfluoroalkyl radical with 3–12 C atoms and
X is $NR^1R^2$,
wherein
$R^1$ and $R^2$ are identical or different and can be hydrogen, $C_1$–$C_{18}$ alkyl, $C_7$–$C_{20}$ aralkyl and $C_5$–$C_{20}$ cycloalkyl, and furthermore $R^1$ and $R^2$ can form a heterocyclic structure with the N atom.

Ammonium salts of perfluoroalkanesulphonic acids are in particular those of the formula IIb $$R_F - SO_2 - X \qquad \text{IIb}$$

wherein
$R_F$ has the meaning indicated for IIa and
X is $O^-$ $[NR^1R^2R^3R^4]^+$,
wherein
$R^1$, $R^2$, $R^3$ and $R^4$ can be either hydrogen or identical or different $C_1$–$C_{18}$ alkyls, $C_7$–$C_{20}$ aralkyls and $C_5$–$C_{20}$ cycloalkyls.

Cyclimmonium salts of perfluoroalkanesulphonic acids are especially those of the formula IIc $$R_F - SO_2 - X \qquad \text{IIc}$$

wherein
$R_F$ has the meaning indicated for IIa and X is

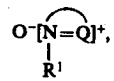

wherein
$R^1$ can be $C_1$–$C_{18}$ alkyl, $C_7$–$C_{20}$ aralkyl or $C_5$–$C_{20}$ cycloalkyl and N = Q is an aromatic heterocyclic compound containing 1 hetero nitrogen atom, such as pyridine

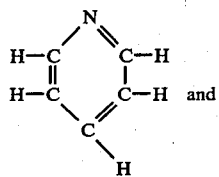

and quinoline

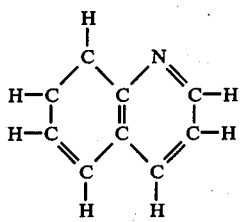

The mold release agents according to the invention are employed in amounts of about 0.001 to 1% by weight, preferably about 0.001 to 0.01% by weight, relative to the weight of polycarbonate.

According to the present invention, the following advantages are achieved:

The mechanical properties of the polycarbonates and their molecular weight are uninfluenced by the added mold release agent. Even after heating for 300 hours at 130° C, no molecular weight degradation and no deterioration in the mechanical properties is observed. This is specifically of particular advantage in relation to multiple extrusion and reprocessing of scrap.

The mechanical properties of the polycarbonates being molded according to the invention are identical with those of the pure polycarbonates being molded. Because of the unusual heat stability and complete solubility of the perfluoroalkanesulphonic acid derivatives of the invention in the polycarbonate melt, the polycarbonate molding materials being molded according to the instant invention remain transparent and completely colorless.

By using the molding process of the invention, excellent mold release of polycarbonate moldings is achieved, a particular advantage being that the mold release can take place in a very broad temperature range. As a result, the injection molding cycles become independent of temperature fluctuations in the injection mold, and this is a great advantage for the plastics processor.

The surprising feature of the invention is that compared to known mold release agents, such as, for example, the fatty acid esters of glycerol, mold release properties which are far superior to those with known mold release agents are achieved with far smaller amounts of the mold release agents according to the invention. Thus, for example, the mold release behavior of an aromatic polycarbonate achieved by adding 0.001% by weight of tetraethylammonium perfluorooctanesulphonate is only achieved with substantially greater amounts (0.5% by weight) of, for example, glycerol tristearyl ester, but at this concentration the ester already adversely influences the mechanical properties of the polycarbonates if the polycarbonates are exposed to heat for prolonged periods.

Aromatic polycarbonates used in the sense of the present invention are understood to include homopolycarbonates and copolycarbonates based, for example, on one or more of the following bisphenols: bis-(hydroxyphenyl)-alkanes and bis-(hydroxyphenyl)-cycloalkanes, as well as their nuclear-alkylated and nuclear-halogenated compounds. Further aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846, in German Offenlegungsschriften (German published specification) Nos. 1,570,703; 2,063,050; 2,063,052; 2,211,956 and 2,211,957, in French patent specification No. 1,561,518 and in the monograph "H. Schnell, Chemistry and Physics of Polycarbonates, Interscience Publishers, New York, 1964".

Examples of preferred bisphenols are: 2,2-bis-(4-hydroxyphenyl)-propane, 2,4-bis-(4-hydroxylphenyl)-2-methylbutane, 1,1-bis-(hydroxyphenyl)-cyclohexane, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methylbutane, 1,1-bis-(3,5-dimethyl-4-hydroxyphenyl)-cyclohexane, 2,2-bis-(3,5-dichloro-4-hydroxyphenyl)-propane and 2,2-bis-(3,5-dibromo-4-hydroxyphenyl)-propane.

Examples of particularly preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4hydroxyphenyl)-cyclohexane.

Preferred aromatic polycarbonates are those based on one or more of the bisphenols stated to be preferred. Particularly preferred polycarbonates are based on 2,2-bis-(4-hydroxyphenyl)-propane and optionally one of the other bis-phenols stated to be particularly preferred.

The aromatic polycarbonates can be manufactured according to known processes, e.g., in accordance with the melt transesterification process from bisphenols and diphenyl carbonate, and in accordance with the two-phase boundary process from bisphenols and phosgene, as described in the abovementioned literature.

The aromatic polycarbonates can also be branched as a result of the incorporation of small amounts of polyhydroxy compounds having more than two aromatic hydroxy groups, e.g. 0.05–2.0 mol-% relative to the bisphenols employed. Polycarbonates of this nature are described, for example, in German Offenlegungsschriften (German published specification) Nos. 1,570,533; 1,595,762; 2,116,974 and 2,113,347, British Pat. No. 1,079,821 and U.S. Pat. No. 3,544,514. Some examples of the polyhydroxy compounds which can be used are phloroglucinol, 4,6-dimethyl-2,4,6-tri-(4hydroxyphenyl)-heptane-2,4,6-dimethyl-2,4,6-tri-(4-hydroxyphenyl)-heptane; 1,3,5-tri-(4-hydroxyphenyl)-benzene, 1,1,1-tri-(4-hydroxyphenyl)ethane, tri-(4-hydroxyphenyl)-phenylmethane, 2,2-bis-[4,4'(4,4'-dihydroxydiphenyl)-cyclohexyl]-propane, 2,4-bis-(4-hydroxyphenyl-isopropyl)-phenol, 2,6-bis-(2'-hydroxy-5'-methylbenzyl)-4-methylphenol, 2-(4-hydroxyphenyl)-2-(2,4-dihydroxyphenyl)-propane and 1,4-bis-(4',4''-dihydroxy-triphenylmethyl)-benzene.

The aromatic polycarbonates should as a rule have molecular weights $M_w$ of about 10,000 to more than 200,000, preferably of about 20,000 to 80,000.

Perfluoroalkanesulphonic acid derivatives in the sense of the present invention are in particular those of the formula $$R_F-SO_2-X \text{ II (IIa + IIb + IIC)}$$

as explained above.

It is possible to prepare the ammonium salts of the formula IIb, wherein

R¹, R², R³ and R⁴ can be alkyl, aralkyl, cycloalkyl or hydrogen, in accordance with the following method:

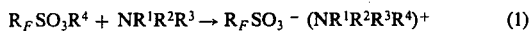

$$R_F SO_3 R^4 + NR^1R^2R^3 \rightarrow R_F SO_3^- (NR^1R^2R^3R^4)^+ \quad (1)$$

In this method, either the free perfluoroalkanesulphonic acids or the corresponding esters — which are known to have a powerful alkylating action — can be reacted with ammonia or primary, secondary or tertiary amines (compare also J. Org. Chem. 37, 24, pages 3,968–71 (1972)).

By this method it is possible to obtain: $R_F SO_3NH_4$, $R_R SO_3NH_3R^1$, $R_R SO_3NH_2R^1R_2$, $R_F SO_3NHR^1R^2R^3$ and $R_F SO_3NR^1R^2R^3R^4$, in which five compounds R¹, R², R³ and R⁴ can, with the exception of hydrogen, be the alkyls, aralkyls or cycloalkyls mentioned for formula IIb on page 4 and $R_F$ has the meaning indicated in formula IIb on page 4.

A further method of preparation of the ammonium salts of formula IIb is according to equation 2:

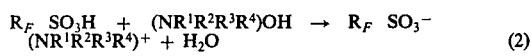

$$R_F SO_3H + (NR^1R^2R^3R^4)OH \rightarrow R_F SO_3^- (NR^1R^2R^3R^4)^+ + H_2O \quad (2)$$

wherein

R¹, R², R³ and R⁴ can be hydrogen, the alkyls, aralkyls or cycloalkyls mentioned for formula IIb on page 4, and $R_F$ has the meaning indicated in formula IIb on page 4. (For example, compare J. Org. Chem. 37,24 pages 3,968–71 (1972)).

A further method of preparation of the ammonium salts of formula IIb, wherein

R¹ to R⁴ must not be hydrogen, is according to equation (3):

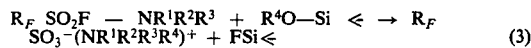

$$R_F SO_2F + NR^1R^2R^3 + R^4O-Si\lessdot \rightarrow R_F SO_3^-(NR^1R^2R^3R^4)^+ + FSi\lessdot \quad (3)$$

wherein

R¹, R², R³ and R⁴ can, with the exception of hydrogen, be the alkyls, aralkyls or cycloalkyls mentioned for formula IIb on page 4 and $R_F$ has the meaning indicated in formula IIb on page 4.

The reaction of perfluoroalkanesulphonyl fluoride with a tertiary amine (NR¹R²R³) in the presence of a silane is described by V. Beyl, H. Niederprüm and P. Voss in Liebigs Ann. Chem. 731, 58–66 (1970) and in DOS (German published specification) No. 1,929,665 as well as in U.S. Pat. No. 3,723,512.

Compounds of type IIb are, for example: trimethyl-stearyl-ammonium perfluorohexanesulphonate, trimethyldodecyl-ammonium perfluoroheptanesulphonate, trimethylstearyl-ammonium perfluorododecansulphonate, tetramethylammonium perfluorooctanesulphonate, tetraethyl-ammonium perfluorooctanesulphonate, tributyl-ethyl-ammonium perfluorooctanesulphonate, tripropyl-amyl-ammonium perfluorooctanesulphonate, tripropyl-amyl-ammonium perfluorodecanesulphonate, N,N-dimethylimidazolinium perfluorooctanesulphonate, N,N-dimethylmorpholinium perfluorooctanesulphonate, N,N-dimethylpyrolidinium perfluorooctanesulphonate, trimethylbenzylammonium perfluorooctanesulphonate, tetramethylammonium perfluorooctanesulphonate and ammonium perfluorooctanesulphonate.

The amides of the formula IIa can be obtained analogously according to known processes, in the absence of water, by reaction of the perfluoroalkanesulphonic acid halides with secondary or primary amines or ammonia: see Gmelin Handbuch (Gmelin's Handbook), supplement to 8th edition, volumne 12, part 2, pages 158 et seq.

Examples of compounds of type IIa are: N-cyclohexylperfluorooctanesulphonamide, N-methyl-perfluorooctanesulphonamide, N-methyl-perfluorodecanesulphonamide, N-butyl-perfluorooctanesulphonamide, N,N-dimethyl-perfluorooctanesulphonamide, N-benzylperfluorodecanesulphonamide, N-stearyl-perfluorooctanesulphonamide, N-stearyl-N-methyl-perfluorooctanesulphonamide and perfluorooctanesulphonamide.

The cyclimmonium salts of the formula IIc are also obtainable in accordance with the reaction, described by V. Beyl, H Niederprüm and P. Voss in Liebigs Ann. Chem. 731 58–66 (1970), of perfluoroalkanesulphonyl fluoride with silane in the presence of the corresponding heterocyclic nitrogen compounds.

Examples of compounds of type IIc are: N-methylpyridinium perfluorobutanesulphonate, N-methylpyridinium perfluorooctanesulphonate and N-methylquinolinium perfluorooctanesulphonate.

The use, according to the invention, of the perfluoroalkanesulphonic acid derivatives of the formula IIb and IIc as mold release agents for polycarbonates according the process of the instant invention was surprising inasmuch as it was to be expected at the polycarbonate processing temperature of about 280° C and above, that quaternized nitrogen compounds of this type would decompose thermally, as described by A. W. v. Hofmann, with elimination of the corresponding olefines or ring scission (compare H. Beyer, Lehrbuch der org. Chem., (Textbook of Organic Chemistry), 1963, page 632). Hence, merely tetraethylammonium perfluorooctanesulphonate will be mentioned as an example here; according to differential thermo-analysis and thermogravimetric analysis this compound is completely heat-stable up to about 370° C. This heat stability of this quaternized nitrogen compound was not to be expected.

A further unusual property of this fluorine compound is that in contrast to many other surface-active agents it evidently undergoes extremely rapid orientation in the boundary phase and can furthermore also diffuse very rapidly into the boundary phase, so that this peculiarity here comes into full play, as the injection molding sequences take place rapidly.

It follows from the preceding remarks that particularly the tetraalkylammonium perfluoroalkanesulphonates are suitable for use as mold release agents according to the present invention, especially also because they are industrially easily accessible; this last remark is especially true for tetraethylammonium perfluorooctanesulphonate.

The use, according to the invention, of the perfluoroalkanesulphonic acid derivatives of the formula IIa as mold release agents for polycarbonates according the process of the instant invention was surprising inasmuch at it was to be expected at the polycarbonate processing temperature of about 280° C and above that the amides of the formula IIa which generally are liquid at a temperature of about 20° C are distilling off the polycarbonate melt. This doesn't happen.

The mold release agents used according to the process of the invention are incorporated by any methods known in the art, for example, by applying the substances, onto the granules of the polycarbonate by tumbling respectively by spraying and subsequently extruding the material on a twin-screw extruder at about 280° C to form a ribbon, which is granulated.

However, the mold release agent can also be incorporated into the polycarbonate during the manufacture of the polycarbonate, In that case the perfluoro compound is either admixed, as a solution in a solvent, before reaching the devolatilization screw, or is metered, without solvent, into the polycarbonate melt.

In view of the small amounts of mold release agents to be used according to the process of the invention it is advantageous, for uniform metering and incorporation, first to prepare a concentrate of the perfluoro compounds to be used according to the process of the invention in polycarbonate, according to customary methods, and to meter this concentrate into the polycarbonate melt.

The use according to the invention of the mold release agents has no adverse effect either on the transparency or on the color of the polycarbonates.

Optionally, dyestuffs, pigments, stabilizers, flameproofing agents, fillers and glass fibers and other materials can also be added to the polycarbonate without thereby impairing the effectivenss of the mold release agent.

Suitable glass fibers in this context are all grades and types of glass fiber which are commercially available, i.e., cut glass fibers (long glass fibers and short glass fibers) and rovings or staple fibers, provided that they have been finished with suitable sizes to make them compatible with polycarbonate.

The length of the glass filaments, whether bundled to form fibers or not, should be between 60 mm and 6 mm in the case of long glass fibers, whereas in the case of short glass fibers the maximum length should be between 5 mm (5000μm) and 0.05 mm (50 μm).

Two types of glass fiber are particularly preferred: I. Long glass fibers having an average fiber length of 6,000μm, a diameter $\phi$ of 10 μm and a powder content (<50 μm) of about 1% by weight, and II. Ground short glass fibers having an average fiber length of 230 μm, a diameter $\phi$ of 10 μm and a powder content (<50 μm) of about 5% by weight.

Usable glass materials are alkali-free aluminumboronsilicate glass ("E-glass") and also alkali-containing "C-glass".

Suitable sizes which can be used are those known from the literature; the known aqueous size for short glass fibers (compare DT-AS (German published specification) No. 1,201,991) has proven particularly suitable for polycarbonate compositions.

Further details regarding glass fibers and their use in plastics, especially in polycarbonates, are known from "Harro Hagen, Glasfaserverstärkte Kunststoffe" (Glass fiber-reinforced plastics), Springer-Verlag, Berlin, Göttingen, Heidelberg, 1961 (especially pages 182-252) and from U.S. Pat. No. 3,577,378 (Ue 2,159-Cip).

In the present context, the glass fibers can be used in the customary amounts, preferably in amounts of 1% by weight to 30% by weight, relative to the total weight of glass fibers + polycarbonate.

The thermoplastic polycarbonate molding materials being molded according to the invention so as to have good mold release properties are employed wherever moldings are manufactured fully automatically, in large numbers and with short cycle times, by the injection molding process. This applies, for example, to the use in the electrical industry and the optical field, for example for terminal bars, bobbins, housing components such as projector housings, floors of switch cabinets and the like, and for particularly complicated moldings which are molded in molds in which there are zones which differ greatly in temperature. When manufacturing such articles, no mold release difficulties are found even at elevated temperatures.

The effectiveness of the perfluoroalkanesulphonic acid derivatives is measured in terms of the mold release forces required for the mold release of injection molding materials. In the examples which follow, these forces are measured by rendering visible, via an optical and at the same time recording indicator instrument, the pressure which builds up in the hydraulic cylinder of the ejector system during mold release.

The examples which follow are intended to explain the subject of the invention in more detail:

EXAMPLES

Preparation of a polycarbonate and preparation of one mold release agent of each of the formula IIa, IIb and IIc.

General Instructions for the Preparation of Polycarbonates.

Approximately 454 parts of 4,4'-dihydroxydiphenyl-2,2-propane and 9.5 parts of p-tert.-butylphenol are suspended in 1.5 liters of water. The oxygen is removed from the reaction mixture in a 3-necked flask, equipped with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. While maintaining this temperature by cooling, 237 parts of phosgene are added over a period of 120 minutes. An additional amount of 75 parts of a 45% strength sodium hydroxide solution is added after 15-30 minutes or after the absorption of phosgene has started. 1.6 parts of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free from salt and alkali. The polycarbonate is isolated from the wash solution and dried. The polycarbonate has a relative viscosity of 1.29-1.30, measured in a 0.5% strength solution in methylene chloride at 20° C. This corresponds approximately to a molecular weight of 32,000. The polycarbonate thus obtained is extruded and granulated.

Preparation of a mold release agent of the formula IIa

N-Methyl-perfluorooctanesulphonamide is obtained in accordance with U.S. Pat. No. 3,636,085 of Ciba-Geigy Corp. (E. K. Kleiner) from perfluorooctanesulphonyl fluoride and methylamine in ether as the solvent, at a reaction temperature of −30° to 0° C and with a reaction time of 2-3 hours. The melting point is 101°-103° C.

Preparation of a mold release agent of the formula IIb

Preparation of tetraethylammonium perfluorooctanesulphonate 750 g of chlorobenzene, 272 g (0.5 mol) of 92.4% strength perfluorooctanesulphonyl fluoride, 53 g (0.53 mol) of triethylamine and 31.2 g (0.175 mol) of triethoxymethylsilane are introduced into a 2 liter flask with stirrer and reflux condenser. The temperature of the reaction mixture rises by a few degrees (from about 25° to 30° C), and thereafter the mixture is warmed to 100° C over a period of 1 hour, while stirring. At approximately this temperature, a slight evolution of gas starts, and this becomes vigorous on warming to 105° C. The trifluoromethylsilane thereby produced (boiling point = −30° C) is passed through a gas bubble counter connected to the reflux condenser and is condensed at −78° C. When the evolution of gas has ceased, the mixture is allowed to cool to room temperature while stirring. A yellow-colored precipitate crystallizes; this is filtered off and dried in vacuo (10 mm Hg). The tetraethylammonium perfluorooctanesulphonate thus obtained is already very pure but can easily be recrystallized from chlorobenzene. Yield: 300 g (95.3% of theory), relative to perfluorooctanesulphonyl fluoride employed.

Preparation of a mold release agent of the formula IIc

N-methyl-pyridinium perfluorobutanesulphonate 151 g (0.5 mol) of perfluorobutanesulphonyl fluoride, 30 g (0.025 mol) of dimethyldimethoxysilane, 39.5 g (0.5 mol) of pyridine and 200 ml of acetonitrile as the solvent are mixed in a flask, and stirred; the second phase originally present disappears over the course of about 10 hours. The solvent, and the fluorosilane formed, are then distilled off and the residue is washed with benzene. After drying, the desired compound is obtained in a yield of about 85% of theory.

I. The aromatic polycarbonates used

Their viscosities are measured at 25° C in methylene chloride at a concentration of 5 g/l.

A. An aromatic polycarbonate based on 4,4'-dihydroxydiphenylpropane-2,2(bisphenol A) and having a relative viscosity of $\eta_{rel.} = 1.30$, and $M_{LS} = 28,000$ ($M_{LS}$ = molecular weight determined by light scattering).

B. An aromatic polycarbonated based on 90 mol% of bisphenol A and 10 mol% of 4,4'-dihydroxy-3,3',5,5'-tetrabromodiphenylpropane-2,2 (tetrabromobisphenol A), having a relative viscosity of $\eta_{rel.} = 1.33$, and $M_{LS} = 37,000$. ($M_{LS}$ = molecular weight determined by light scattering).

C. An aromatic polycarbonate based on 70 mol% of bisphenol A and 30 mol% of 4,4'-dihydroxy-3,3',5,5'-tetramethyldiphenylpropane-2,2 (tetramethylbisphenol A) having a relative viscosity of $\eta_{rel.} = 1.28$, and $M_{LS} = 31,000$.

D. An aromatic polycarbonate based on 4,4'-dihydroxydiphenylpropane-2,2 (bisphenol A) having a relative viscosity of $\eta_{rel.} = 1.32$ and $M_{LS} = 30,000$, with a glass fiber content (sized long glass fibers, average fiber length, 6 mm, diameter 10μ, powder content < 50μ, approx. 1%) of 20% by weight. It is obtained by extruding 80 kg of a polycarbonate of relative viscosity $\eta_{rel.} = 1.32$, and $M_{LS} = 30,000$ in a twin-screw extruder at 310° C. At the same time, 20 kg of glass fibers (sized long glass fibers, average fiber length 6 mm, diameter 10μ, powder content < 50μ, 1% by weight) are added. The polycarbonate which has been glass-fiber-reinforced in this way is granulated in accordance with customary techniques. The properties are described in Tables 1 and 2.

II. The mold release agents used

E. Glycerol triesters with acid radicals of stearic acid, palmitic acid and myristic acid in the ratio of 1:1:0.1, melting point 48° C. (Obtainable in accordance with customary ester syntheses; compare also DT-OS (German published specification) No. 2,064,095 and U.S. Pat. No. 3,784,595).

F. Tetraethylammonium perfluorooctanesulphonate, melting point 170° to 190° C; $C_8F_{17}SO_3^- [N(C_2H_5)_4]^+$.

G. N-Methyl-perfluorooctanesulphonamide $C_8F_{17}SO_2NHCH_3$, melting point = 101°–103° C.

H. N-methyl-pyridinium perfluorobutanesulphonate, $C_4F_9SO_3^-[CH_3N^+C_5H_5]$, melting point = 83°–85° C.

EXAMPLES 1, 2, 3 AND 4

(Polycarbonates A, B, C and D without mold release agents)

The mold release behavior of the polycarbonates A, B, C and D is tested on a conical cylinder of 35 mm length and of 40 and 42 mm diameters, and 3 mm wall thickness, by measuring the pressure which builds up in the ejector system. The mold release pressures and temperatures are indicated in Table 1. A molding injection-molded from these polycarbonates at 270° C has the mechanical properties described in Table 2.

EXAMPLE 5

0.5 kg of mold release agent E is applied to 99.5 kg of polycarbonate A by tumbling in a drum at room temperature and the material is then extruded to a ribbon on an extruder at 280° C, and is granulated. The mold release behavior is tested as in Example 1. The properties are described in Tables 1 and 2.

EXAMPLE 6

0.1 kg of mold release agent G is applied to 99.9 kg of polycarbonate A by tumbling in a drum at room temperature and the material is then extruded to a ribbon on an extruder at 280° C, and is granulated. The mold release behavior is tested as described in Example 1. The properties are described in Table 1 and 2.

EXAMPLE 7

10 kg of polycarbonate B (containing 0.1% by weight of mold release agent F) are metered into 90 kg of pure polycarbonate B in a twin-screw extruder at 310° C, and the material is extruded to a ribbon which is granulated. The mold release behavior is tested as in Example 1. The properties are described in Tables 1 and 2.

EXAMPLE 8

1 kg of polycarbonate C (containing 0.1% by weight of mold release agent F) is metered into 99 kg of pure polycarbonate C in a twin-screw extruder and the material is extruded to a ribbon at 300° C and is granulated. The mold release behavior is tested as in Example 1. The properties are described in Tables 1 and 2.

EXAMPLE 9

100 kg of polycarbonate D, during the manufacture of which 10 g of a mold release agent H are metered in together with the glass fibers. The properties of the granules obtained after extrusion are described in Tables 1 and 2.

TABLE 1

Mold Release Behavior of the Polycarbonates from Examples 1 to 9

MOLD RELEASE TEMPERATURE ° C
MOLD RELEASE PRESSURE, BARS

| EXAMPLE | COMPOSITION | 150° C | 160° C | 170° C | 180° C |
|---|---|---|---|---|---|
| 1 | 100% of polycarbonate A | 40 | 30 | 85 | Does not release |
| 2 | 100% of polycarbonate B | 44 | 36 | 80 | " |
| 3 | 100% of polycarbonate C | 48 | 35 | 82 | " |
| 4 | 100% of polycarbonate D | 42 | 65 | does not release | Does not release |
| 5 | 99.5% of polycarbonate A 0.5% of mold release agent E | 40 | 15 | 37 | Sticks firmly |
| 6 | 99.9% of polycarbonate A 0.1% of mold release agent G | 12 | 5 | 3 | 80 |
| 7 | Polycarbonate B 0.01% of mold release agent F | 25 | 10 | 3 | 35 |
| 8 | Polycarbonate C 0.001% of mold release agent F | 22 | 10 | 6 | 80 |
| 9 | Polycarbonate D 0.01% of mold release agent H | 18 | 18 | 80 | Sticks firmly |

TABLE 2

Properties of the polycarbonates from Examples 1 to 9

| | Dimension | DIN | 1 | 2 | 3 | 4 | 5 | 6 | 7 | 8 | 9 |
|---|---|---|---|---|---|---|---|---|---|---|---|
| $B_{rel}$ | | | 1.30 | 1.33 | 1.28 | 1.30 | 1.28 | 1.29 | 1.32 | 1.28 | 1.30 |
| Elongation at break | % | 53,455 | 120 | 100 | 125 | 4.3 | 110 | 115 | 100 | 120 | 4.3 |
| Notched impact strength | KJ/m$^2$ | 53,453 | 44 | 38 | 14 | 12 | 36 | 43 | 39 | 14 | 12 |
| Vicat B | ° C | 53,460 | 150 | 155 | 156 | 153 | 145 | 150 | 151 | 150 | 153 |
| Elongation at break after heating* | | 53,455 | 115 | 100 | 120 | 3.5 | 60 | 110 | 100 | 115 | 3.2 |
| Vicat B after heating* | | 53,460 | 150 | 154 | 154 | 152 | 135 | 148 | 150 | 150 | 152 |
| $B_{rel}$ after heating* | | | 1.30 | 1.32 | 1.29 | 1.30 | 1.24 | 1.29 | 1.31 | 1.27 | 1.30 |

*The polycarbonate test specimens were heated for 300 hours at 130° C

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for molding thermoplastic, high molecular weight, aromatic polycarbonates, the improvement which comprises adding to the aromatic polycarbonate from about 0.001 to 1% by weight of a mold release agent selected from the group consisting of perfluoro-alkanesulphonic acid amides and cyclimmonium salts of perfluoro-alkanesulphonic acids.

2. The process of claim 1 wherein the aromatic polycarbonate has a molecular weight from about 10,000 to 200,000.

3. The process of claim 1 wherein from about 0.001 to 0.01% by weight of the mold release agent are added.

4. The process of claim 1 wherein the mold release agent consists of perfluoroalkanesulphonic acid amides of the general formula IIa:

$$R_F - SO_2 - X \qquad \text{IIa}$$

wherein
$R_F$ is a linear or branched aliphatic perfluoroalkyl radical with 1 to 12 C atoms or a cyclic aliphatic perfluoroalkyl radical with 3-12 C atoms and
X is NR$^1$R$^2$,
wherein
R$^1$ and R$^2$ are identical or different and can be hydrogen, C$_1$-C$_{18}$ alkyl, C$_7$-C$_{20}$ aralkyl and C$_5$-C$_{20}$ cycloalkyl, and furthermore R$^1$ and R$^2$ can form a heterocyclic structure with the N atom.

5. The process of claim 1 wherein the mold release agent consists of cyclimmonium salts of perfluoroalkanesulphonic acids of the general formula IIc:

$$R_F - SO_2 - X$$

wherein
$R_F$ is a linear or branched aliphatic perfluoroalkyl radical with 1 to 12 C atoms or a cyclic aliphatic perfluoroalkyl radical with 3-12 C atoms and
X is

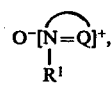

wherein
R$^1$ can be C$_1$-C$_{18}$ alkyl, C$_7$-C$_{20}$ aralkyl or C$_5$-C$_{20}$ cycloalkyl and

 is an aromatic heterocyclic compound containing 1 hetero nitrogen atom.

6. The process of claim 1 wherein said aromatic polycarbonate is derived from an aromatic dihydroxydiaryl compound of the general formula:

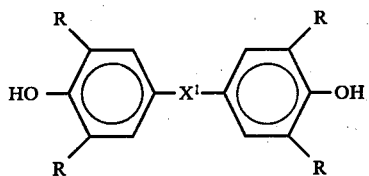

wherein
R are identical or different and are H, C$_1$-C$_4$ alkyl, Cl or Br and
X$^1$ is C$_1$-C$_8$ alkylene, C$_2$-C$_8$ alkylidene, C$_5$-C$_{15}$ cycloalkylene and C$_5$-C$_{15}$ cycloalkylidene.

7. The process of claim 6 wherein said aromatic dihydroxydiaryl compound is selected from the group consisting of 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

8. The process of claim 1 wherein a glass fiber is added to the aromatic polycarbonate and the mold release agent.

* * * * *